(12) United States Patent  (10) Patent No.: US 9,841,630 B2
Huang  (45) Date of Patent: Dec. 12, 2017

(54) THIN-FILM TRANSISTOR ARRAY SUBSTRATE AND LIQUID CRYSTAL DISPLAY PANEL

(71) Applicant: Shenzhen China Star Optoelectronics Technology Co., Ltd., Shenzhen, Guangdong (CN)

(72) Inventor: Shishuai Huang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 182 days.

(21) Appl. No.: 14/908,115

(22) PCT Filed: Sep. 8, 2015

(86) PCT No.: PCT/CN2015/089147
§ 371 (c)(1),
(2) Date: Jan. 27, 2016

(87) PCT Pub. No.: WO2017/028344
PCT Pub. Date: Feb. 23, 2017

(65) Prior Publication Data
US 2017/0261815 A1  Sep. 14, 2017

(30) Foreign Application Priority Data

Aug. 17, 2015 (CN) .......................... 2015 1 0504794

(51) Int. Cl.
*G02F 1/136* (2006.01)
*G02F 1/1337* (2006.01)
*G02F 1/1368* (2006.01)
*G02F 1/1335* (2006.01)
*G02F 1/1362* (2006.01)

(52) U.S. Cl.
CPC ...... *G02F 1/133707* (2013.01); *G02F 1/1368* (2013.01); *G02F 1/133512* (2013.01); *G02F 2001/136222* (2013.01)

(58) Field of Classification Search
CPC ......... G02F 1/133707; G02F 1/133512; G02F 1/1368; G02F 2001/136222
USPC .......................................................... 349/43
See application file for complete search history.

(56) References Cited

U.S. PATENT DOCUMENTS

| 8,797,495 B2* | 8/2014 | Hou | G02F 1/133512 |
| | | | 349/106 |
| 8,842,108 B2* | 9/2014 | Lee | G02F 1/134363 |
| | | | 345/206 |
| 8,907,325 B2* | 12/2014 | Chuang | G02F 1/133345 |
| | | | 257/40 |

(Continued)

*Primary Examiner* — Hoan C Nguyen
(74) *Attorney, Agent, or Firm* — Andrew C. Cheng

(57) ABSTRACT

A thin-film transistor array substrate and a liquid crystal display panel are provided. The thin-film transistor array substrate includes a substrate, a thin-film transistor array, a color resisting layer and an alignment film The substrate includes a first surface and a second surface opposing to each other. The first surface has a revealing region and a non-revealing region surrounding the revealing region. The thin-film transistor array is arranged on the first surface of the substrate. The color resisting layer is arranged on the thin-film transistor array and has a trench located correspondingly to the non-revealing region. The alignment film is arranged on the color resisting layer.

10 Claims, 8 Drawing Sheets

(56) References Cited

U.S. PATENT DOCUMENTS

2013/0250227 A1\* 9/2013 Kira ................... G02F 1/1339
349/153

\* cited by examiner

THIN-FILM TRANSISTOR ARRAY SUBSTRATE AND LIQUID CRYSTAL DISPLAY PANEL

CROSS-REFERENCE TO RELATED APPLICATIONS

This application claims the priority of China Patent Application No. 201510504794.X, entitled "THIN-FILM TRANSISTOR ARRAY SUBSTRATE AND LIQUID CRYSTAL DISPLAY PANEL", filed on Aug. 17, 2015, the disclosure of which is incorporated herein by reference in its entirety.

FIELD OF THE INVENTION

This disclosure relates to a liquid crystal display and, more particularly, to a thin-film transistor array substrate and a liquid crystal display panel.

BACKGROUND OF THE INVENTION

The liquid crystal display panel includes an array substrate, a color filter substrate, and a liquid crystal layer filled between the array substrate and the color filter substrate. Both of the array substrate and the color filter substrate respectively have an alignment film arranged thereon, such that liquid crystal molecules in the liquid crystal layer can be arranged in alignment along trenches on the alignment film, and controlled by electric fields to form displayed picture planes. These two substrates are installed fixedly through seal agent. On the color filter substrate, a photo spacer is provided to form a block for preventing the alignment film on the color filter substrate from flowing towards the seal agent. However, since there is no block provided on the array substrate, position of the alignment film on the array substrate is merely controlled by the precision thereof. As long as the position precision of the alignment film on the array substrate is not controlled well, the condition of too thin or stacked alignment film may occur at the edge of the display area of the array substrate. Moreover, when the liquid crystal display panel is turned on, non-uniform luminance could happen that is called "Mura" phenomenon.

SUMMARY OF THE INVENTION

According to one aspect of the present disclosure, a thin-film transistor array substrate is proposed that comprises a substrate, a thin-film transistor array, a color resisting layer and an alignment film. The substrate includes a first surface and a second surface opposing to each other. The first surface has a revealing region and a non-revealing region surrounding the revealing region. The thin-film transistor array is arranged on the first surface of the substrate. The color resisting layer is arranged on the thin-film transistor array and has a trench located correspondingly to the non-revealing region. The alignment film is arranged on the color resisting layer.

Further, the color resisting layer may have at least one trench.

Further, the color resisting layer may have a plurality of trenches that are parallel with each other.

Further, the color resisting layer may have a plurality of trenches that are formed in a grid pattern.

Compared with the conventional technique, in the thin-film transistor array substrate of the present disclosure, as the trench is provided on the color resisting layer and located correspondingly to the non-revealing region of the substrate, the alignment film can flow into the trench when being arranged on the color resisting layer, such that the condition of uneven distribution of the alignment film during its free diffusion process on the color resisting layer that is resulted from the influence of surface tension or viscosity can be effectively minimized or eliminated. Thus, when the liquid crystal display panel including the thin-film transistor array substrate is turned on, luminance could be more uniform to eliminate the "Mura" phenomenon. In addition, the thickness of the alignment film also can be distributed more evenly, and therefore the dimension of the non-revealing region can be designed smaller to realize narrow frame of the liquid crystal display panel.

According to another aspect of the present disclosure, a liquid crystal display panel is proposed that comprises a thin-film transistor array substrate. The thin-film transistor array substrate includes a first substrate, a thin-film transistor array, a color resisting layer and a first alignment film. The first substrate includes a first surface and a second surface opposing to each other. The first surface has a revealing region and a non-revealing region surrounding the revealing region. The thin-film transistor array is arranged on the first surface of the first substrate. The color resisting layer is arranged on the thin-film transistor array and has a first trench located correspondingly to the non-revealing region. The first alignment film is arranged on the color resisting layer.

Further, the color resisting layer may have at least one first trench.

Further, the color resisting layer may have a plurality of first trenches that are parallel with each other.

Further, the color resisting layer may have a plurality of first trenches that are formed in a grid pattern.

Further, the liquid crystal display panel of the present disclosure may further comprise a second substrate. The second substrate includes a third surface and a fourth surface opposing to each other. The third surface which is closer to the first surface in comparison with the fourth surface has a black matrix layer. The black matrix layer has a second trench opposing to the first trench.

Further, the second trench may face directly to the first trench or may interlace with the first trench.

BRIEF DESCRIPTION OF THE DRAWINGS

In order to more clearly illustrate the embodiments of the present disclosure or prior art, the following figures will be described in the embodiments are briefly introduced. It is obvious that the drawings are merely some embodiments of the present disclosure, those of ordinary skill in this field can obtain other figures according to these figures without paying the premise.

DETAILED DESCRIPTION OF THE PREFERRED EMBODIMENTS

Embodiments of the present disclosure are described in detail with the technical matters, structural features, achieved objects, and effects with reference to the accompanying drawings as follows. It is clear that the described embodiments are part of embodiments of the present disclosure, but not all embodiments. Based on the embodiments of the present disclosure, all other embodiments to those of ordinary skill in the premise of no creative efforts obtained, should be considered within the scope of protection of the present disclosure.

Figure 1:
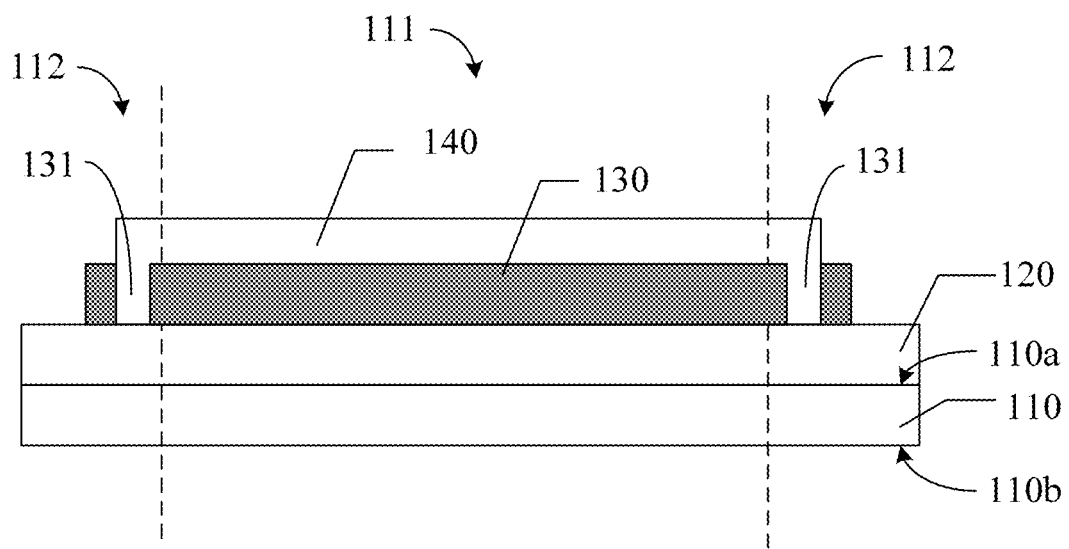
FIG. 1 is a schematic diagram of a thin-film transistor array substrate according to one embodiment of the present disclosure.

Please refer to FIG. 1 which is a schematic diagram of a thin-film transistor array substrate according to one embodiment of the present disclosure. The thin-film transistor array substrate 100 comprises a substrate 110, a thin-film transistor array 120, a color resisting layer 130 and an alignment film 140. The substrate 110 includes a first surface 110*a* and a second surface 110*b* that oppose to each other. The first surface 110*a* has a revealing region 111 and a non-revealing region 112 which surrounds the revealing region 111. The thin-film transistor array 120 is arranged on the first surface 110*a*. The color resisting layer 130 is arranged on the thin-film transistor array 120, and has a trench 131 located correspondingly to the non-revealing region 112. The alignment film 140 is arranged on the color resisting layer 130.

The substrate 110 is transparent, and can be made of a material such as glass or plastics, but this is not a limitation. In this embodiment, the thin-film transistor array 120 arranged on the first surface 110*a* is taken as an exemplification for illustration. It also can be understood that the thin-film transistor array 120 may be arranged on the second surface 110*b* of the substrate 110 in other embodiments.

The thin-film transistor array 120 includes a plurality of thin-film transistors distributed in an array. The thin-film transistor is used for controlling ON or OFF of sub-pixel in each pixel of the liquid crystal display panel, and includes a gate, a source and a drain. The gate is used for receiving control signals to control ON or OFF between the source and the drain. When the source and drain are controlled to set ON by the control signal received by the gate, the thin-film transistor is conducted and its corresponding sub-pixel is turned on. However, in the event that the source and drain are controlled to set OFF by the control signal received by the gate, the thin-film transistor is cut off and its corresponding sub-pixel is turned off.

The color resisting layer 130 generally includes a plurality of light filtering units. In one embodiment, the light filtering unit can be red light filtering unit, green light filtering unit or blue light filtering unit. After the white light emitted from the backlight module is filtered by the color resisting layer 130, color display is achieved.

Figure 2:
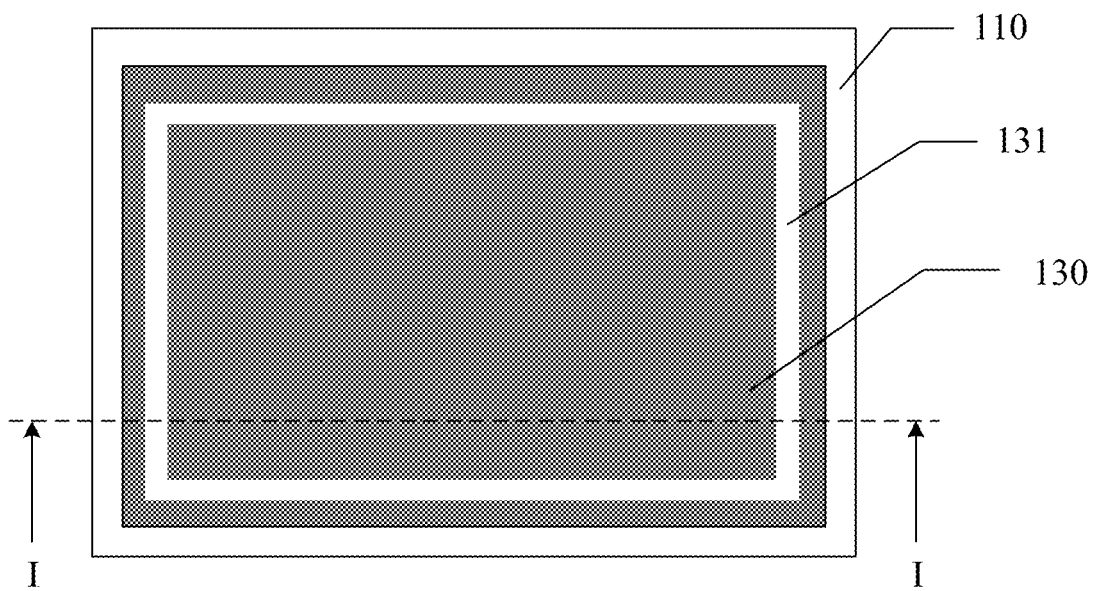
FIG. 2 is a plane schematic diagram of a thin-film transistor array substrate according to a first embodiment of the present disclosure.
Figure 3:
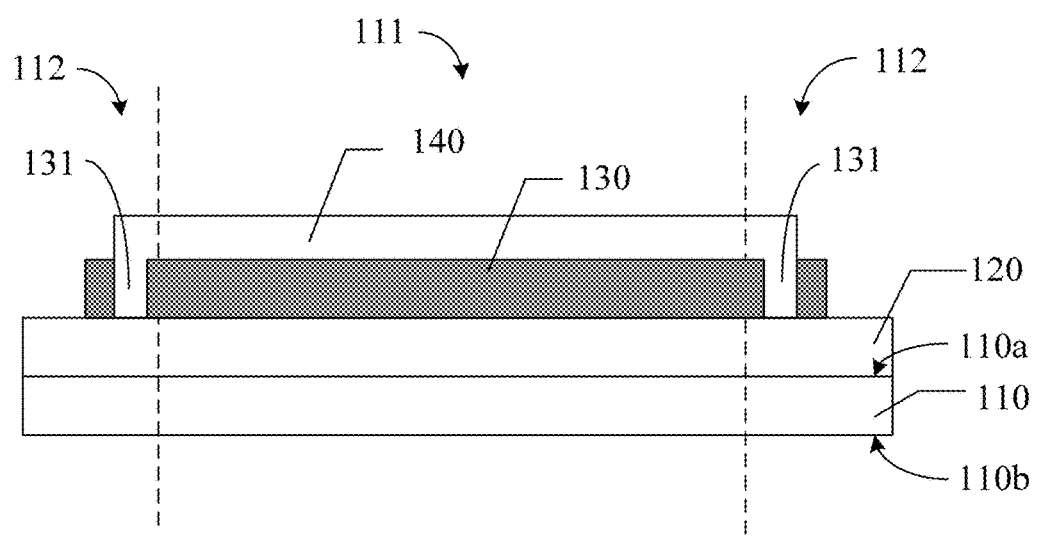
FIG. 3 is a cross-sectional view taken on line I-I shown in FIG. 2.

In one embodiment, the color resisting layer 130 includes at least one trench 131. Please also refer to FIGS. 2 & 3. FIG. 2 is a plane schematic diagram of a thin-film transistor array substrate according to a first embodiment of the present disclosure. FIG. 3 is a cross-sectional view taken on line I-I shown in FIG. 2. In this embodiment, the number of the trench 131 is one.

Figure 4:
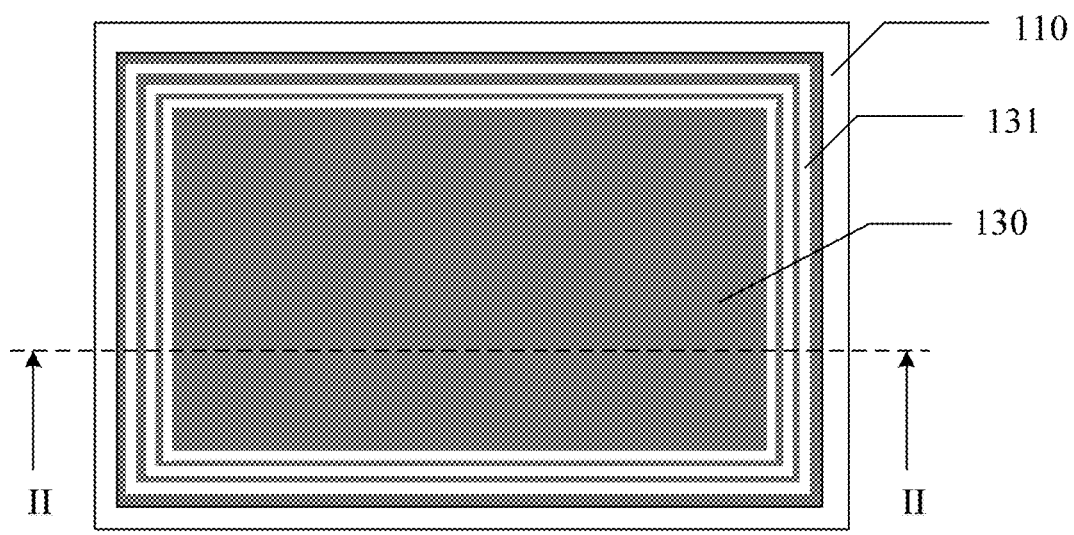
FIG. 4 is a plane schematic diagram of a thin-film transistor array substrate according to a second embodiment of the present disclosure.
Figure 5:
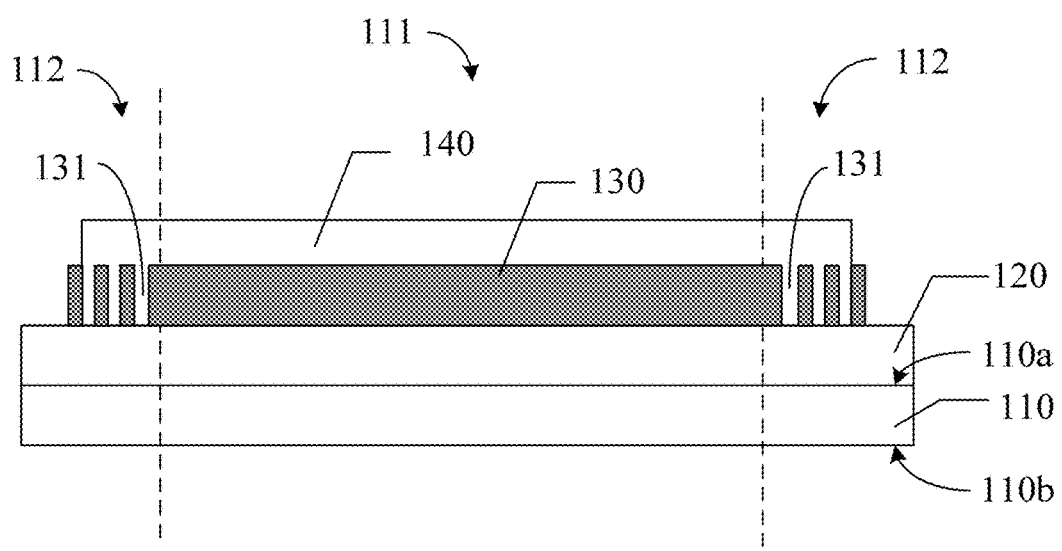
FIG. 5 is a cross-sectional view taken on line II-II shown in FIG. 4.

In one embodiment, the color resisting layer 130 includes a plurality of trenches 131. Please also refer to FIGS. 4 & 5. FIG. 4 is a plane schematic diagram of a thin-film transistor array substrate according to a second embodiment of the present disclosure. FIG. 5 is a cross-sectional view taken on line II-II shown in FIG. 4. In FIGS. 4 & 5, there are three trenches 131 that are parallel with each other. However, it can be understood that the number of the trenches 131 is not limited to three, other numbers in addition to three also can be adopted. Moreover, it can also be understood that the width of the trenches 131 may be similar or dissimilar without limitation.

Figure 6:
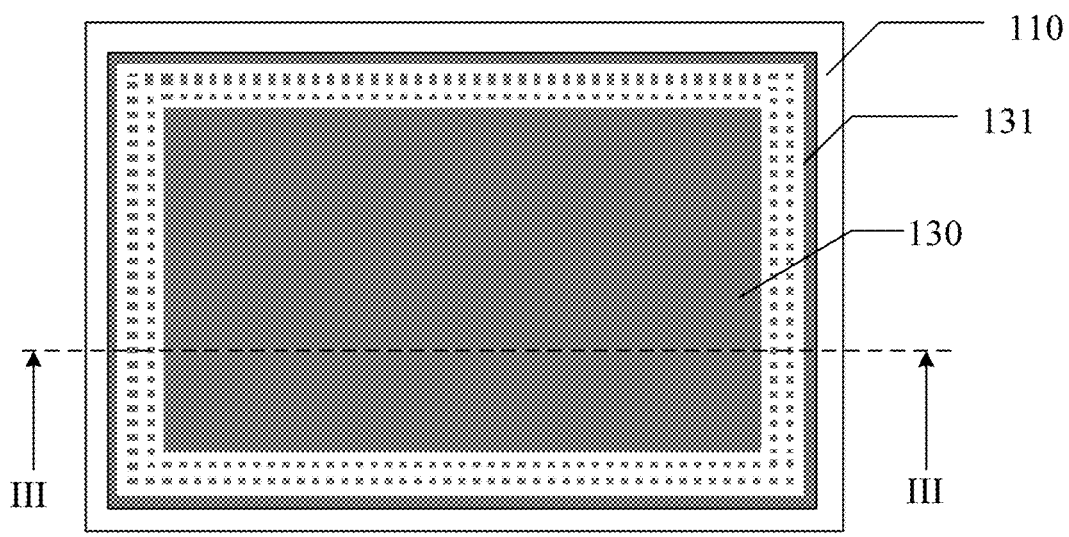
FIG. 6 is a plane schematic diagram of a thin-film transistor array substrate according to a third embodiment of the present disclosure.
Figure 7:
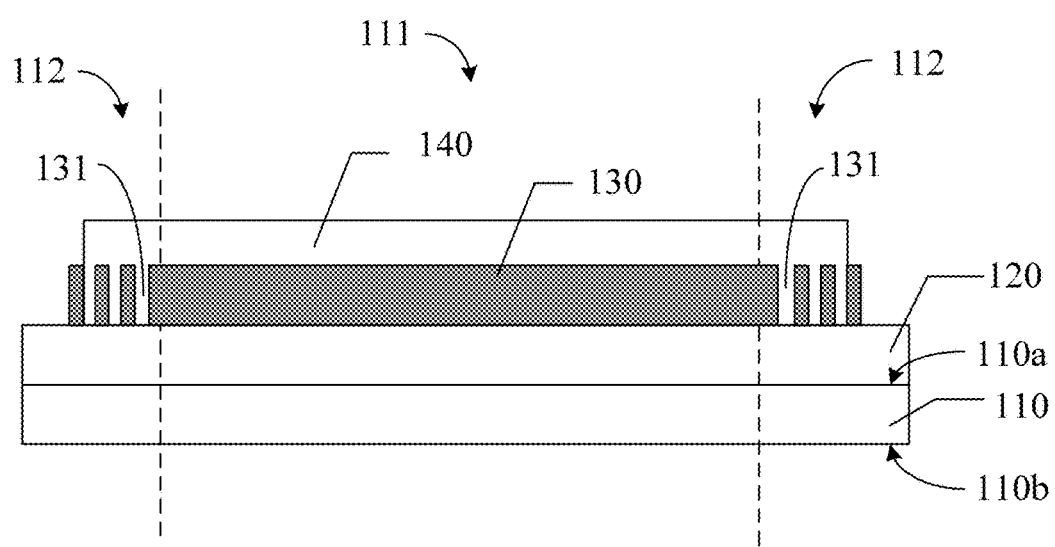
FIG. 7 is a cross-sectional view taken on line III-III shown in FIG. 6.
Figure 8:
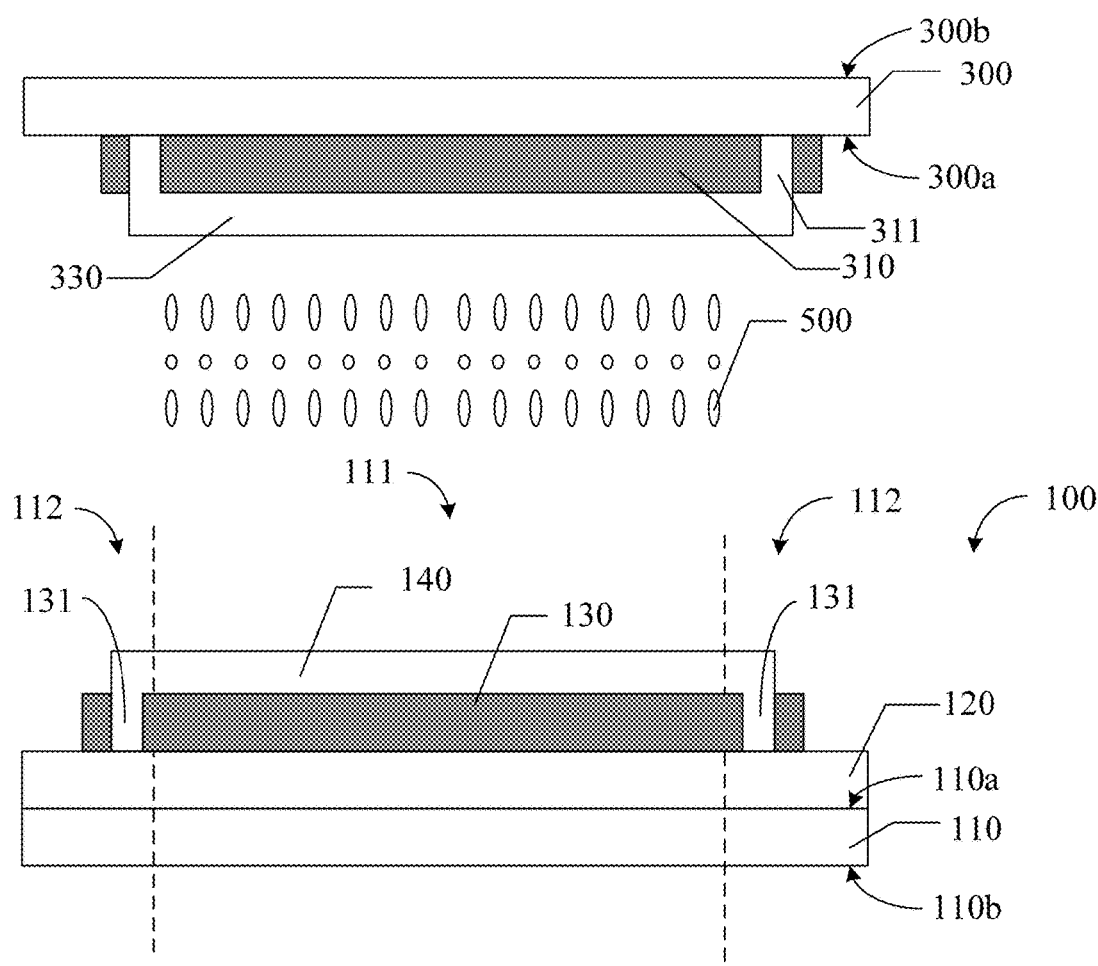
FIG. 8 is a schematic diagram of a liquid crystal display panel according to one embodiment of the present disclosure.

In one embodiment, the color resisting layer 130 includes a plurality of trenches 131 that are formed in a grid pattern. Please also refer to FIGS. 6 & 7. FIG. 6 is a plane schematic diagram of a thin-film transistor array substrate according to a third embodiment of the present disclosure. FIG. 7 is a cross-sectional view taken on line III-III shown in FIG. 6. It can be understood that when the trenches 131 are formed in a grid pattern, the dimension of each grid may be similar or dissimilar without limitation.

Compared with the conventional technique, in the thin-film transistor array substrate 100 of the present disclosure, as the trench 131 is provided on the color resisting layer 130 and located correspondingly to the non-revealing region 112 of the substrate 100, the alignment film 140 can flow into the trench 131 when being arranged on the color resisting layer 130, such that the condition of uneven distribution of the alignment film 140 during its free diffusion process on the color resisting layer 130 that is resulted from the influence of surface tension or viscosity can be effectively minimized or eliminated. Thus, when the liquid crystal display panel including the thin-film transistor array substrate 100 is turned on, luminance could be more uniform to eliminate "Mura" phenomenon. In addition, the thickness of the alignment film 140 also can be distributed more evenly, and therefore the dimension of the non-revealing region 112 can be designed smaller to realize narrow frame of the liquid crystal display panel.

Below is the illustration of the liquid crystal display panel of the present disclosure in company with FIGS. 1-8. Please refer to FIG. 8 which is a schematic diagram of a liquid crystal display panel according to one embodiment of the present disclosure. The liquid crystal display panel 10 comprises a thin-film transistor array substrate 100. In order to distinguish the substrate of the thin-film transistor array substrate 100 with that of the color filter substrate, the substrate in the thin-film transistor array substrate 100 is called "the first substrate", the alignment film in the thin-film transistor array substrate 100 is called "the first alignment film", and the trench of the color resisting layer in the thin-film transistor array substrate 100 is called "the first trench."

The thin-film transistor array substrate 100 comprises a first substrate 110, a thin-film transistor array 120, a color resisting layer 130 and a first alignment film 140. The first substrate 110 includes a first surface 110*a* and a second surface 110*b* that oppose to each other. The first surface 110*a* has a revealing region 111 and a non-revealing region 112 which surrounds the revealing region 111. The thin-film transistor array 120 is arranged on the first surface 110*a*. The color resisting layer 130 is arranged on the thin-film transistor array 120, and has a first trench 131 located correspondingly to the non-revealing region 112. The first alignment film 140 is arranged on the color resisting layer 130.

The first substrate 110 is transparent, and can be made of a material such as glass or plastics, but this is not a limitation. In this embodiment, the thin-film transistor array 120 arranged on the first surface 110a is taken as an exemplification for illustration. It also can be understood that the thin-film transistor array 120 may be arranged on the second surface 110b of the first substrate 110 in other embodiments.

The thin-film transistor array 120 includes a plurality of thin-film transistors distributed in an array. The thin-film transistor is used for controlling ON or OFF of sub-pixel in each pixel of the liquid crystal display panel, and includes a gate, a source and a drain. The gate is used for receiving control signals to control ON or OFF between the source and the drain. When the source and drain are controlled to set ON by the control signal received by the gate, the thin-film transistor is conducted and its corresponding sub-pixel is turned on. However, in the event that the source and drain are controlled to set OFF by the control signal received by the gate, the thin-film transistor is cut off and its corresponding sub-pixel is turned off.

The color resisting layer 130 generally includes a plurality of light filtering units. In one embodiment, the light filtering unit can be red light filtering unit, green light filtering unit or blue light filtering unit. After the white light emitted from the backlight module is filtered by the color resisting layer 130, color display is achieved.

In one embodiment, the color resisting layer 130 includes at least one first trench 131. Please refer to FIGS. 2 & 3 again. FIG. 2 is a plane schematic diagram of a thin-film transistor array substrate according to a first embodiment of the present disclosure. FIG. 3 is a cross-sectional view taken on line I-I shown in FIG. 2. In this embodiment, the number of the first trench 131 is one.

In one embodiment, the color resisting layer 130 includes a plurality of first trenches 131. Please refer to FIGS. 4 & 5 again. FIG. 4 is a plane schematic diagram of a thin-film transistor array substrate according to a second embodiment of the present disclosure. FIG. 5 is a cross-sectional view taken on line II-II shown in FIG. 4. In FIGS. 4 & 5, there are three first trenches 131 that are parallel with each other. However, it can be understood that the number of the first trenches 131 is not limited to three, other numbers in addition to three also can be adopted. Moreover, it can also be understood that the width of the first trenches 131 may be similar or dissimilar without limitation.

In one embodiment, the color resisting layer 130 includes a plurality of first trenches 131 that are formed in a grid pattern. Please refer to FIGS. 6 & 7 again. FIG. 6 is a plane schematic diagram of a thin-film transistor array substrate according to a third embodiment of the present disclosure. FIG. 7 is a cross-sectional view taken on line III-III shown in FIG. 6. It can be understood that when the first trenches 131 are formed in a grid pattern, the dimension of each grid may be similar or dissimilar without limitation.

Moreover, the liquid crystal display panel 10 further comprises a second substrate 300. The second substrate 300 includes a third surface 300a and a fourth surface 300b that oppose to each other. The third surface 300a which is closer to the first surface 110a in comparison with the fourth surface 300b has a black matrix layer 310. The black matrix layer 310 has a second trench 311 opposing to the first trench 131.

A liquid crystal layer 500 is interposed between the second substrate 300 and the thin-film transistor array substrate 100.

In one embodiment, the second trench 311 faces directly to the first trench 131. However, in another embodiment, the second trench 311 interlaces with the first trench 131. When the second trench 311 faces directly to the first trench 131, the frame of the liquid crystal display panel 10 can be minimized. A second alignment film 330 is arranged on the black matrix layer 310.

Compared with the conventional technique, in the thin-film transistor array substrate 100 of the liquid crystal display panel 10 of the present disclosure, as the trench 131 is provided on the color resisting layer 130 and located correspondingly to the non-revealing region 112 of the substrate 100, the alignment film 140 can flow into the trench 131 when being arranged on the color resisting layer 130, such that the condition of uneven distribution of the alignment film 140 during its free diffusion process on the color resisting layer 130 that is resulted from the influence of surface tension or viscosity can be effectively minimized or eliminated. Thus, when the liquid crystal display panel 10 including the thin-film transistor array substrate 100 is turned on, luminance could be more uniform to eliminate "Mura" phenomenon. In addition, the thickness of the alignment film 140 also can be distributed more evenly, and therefore the dimension of the non-revealing region 112 can be designed smaller to realize narrow frame of the liquid crystal display panel 10.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A thin-film transistor array substrate, comprising:
   a substrate comprising a first surface and a second surface opposing to each other, the first surface having a revealing region and a non-revealing region surrounding the revealing region;
   a thin-film transistor array arranged on the first surface of the substrate;
   a color resisting layer which is arranged on the thin-film transistor array and comprises a trench located correspondingly to the non-revealing region; and
   an alignment film arranged on the color resisting layer.

2. The thin-film transistor array substrate according to claim 1, wherein the color resisting layer comprises at least one trench.

3. The thin-film transistor array substrate according to claim 1, wherein the color resisting layer comprises a plurality of trenches that are parallel with each other.

4. The thin-film transistor array substrate according to claim 1, wherein the color resisting layer comprises a plurality of trenches that are formed in a grid pattern.

5. A liquid crystal display panel, comprising a thin-film transistor array substrate which comprises:
   a first substrate comprising a first surface and a second surface opposing to each other, the first surface having a revealing region and a non-revealing region surrounding the revealing region;
   a thin-film transistor array arranged on the first surface of the first substrate;
   a color resisting layer which is arranged on the thin-film transistor array and comprises a first trench located correspondingly to the non-revealing region; and
   a first alignment film arranged on the color resisting layer.

6. The liquid crystal display panel according to claim 5, wherein the color resisting layer comprises at least one first trench.

7. The liquid crystal display panel according to claim 5, wherein the color resisting layer comprises a plurality of first trenches that are parallel with each other.

8. The liquid crystal display panel according to claim 5, wherein the color resisting layer comprises a plurality of first trenches that are formed in a grid pattern.

9. The liquid crystal display panel according to claim 5 further comprising a second substrate, the second substrate comprising a third surface and a fourth surface opposing to each other, the third surface which is closer to the first surface in comparison with the fourth surface having a black matrix layer, the black matrix layer having a second trench opposing to the first trench.

10. The liquid crystal display panel according to claim 9, wherein the second trench faces directly to the first trench or interlaces with the first trench.

* * * * *